No. 637,194. Patented Nov. 14, 1899.
McCLINTOCK YOUNG.
CORN HUSKING MACHINE.
(Application filed July 22, 1898.)

(No Model.) 7 Sheets—Sheet 1.

Fig. 1.
On line a-a

Witnesses
Inventor
McQ Young
By J.J. Dodge
Attorney

No. 637,194. Patented Nov. 14, 1899.
McCLINTOCK YOUNG.
CORN HUSKING MACHINE.
(Application filed July 22, 1898.)

(No Model.) 7 Sheets—Sheet 5.

Fig. 5.

Fig. 6.   Fig. 7.
On line d-d

Witnesses  Inventor
 M C Young
By P T Dodge
 Attorney

THE NORRIS PETERS CO., PHOTO-LITHO., WASHINGTON, D. C.

No. 637,194. Patented Nov. 14, 1899.
McCLINTOCK YOUNG.
CORN HUSKING MACHINE.
(Application filed July 22, 1898.)
(No Model.) 7 Sheets—Sheet 6.

Fig. 8.
On line e-e

Fig. 9.
On line f-f

No. 637,194. Patented Nov. 14, 1899.
McCLINTOCK YOUNG.
CORN HUSKING MACHINE.
(Application filed July 22, 1898.)
(No Model.) 7 Sheets—Sheet 7.

Fig. 10.
On line g·g

Fig. 11.
On line h·h

Witnesses
Arthur Ashley
F. A. Elmore

Inventor
McC. Young
By P. T. Dodge
Attorney

UNITED STATES PATENT OFFICE.

McCLINTOCK YOUNG, OF FREDERICK, MARYLAND.

CORN-HUSKING MACHINE.

SPECIFICATION forming part of Letters Patent No. 637,194, dated November 14, 1899.

Application filed July 22, 1898. Serial No. 686,621. (No model.)

*To all whom it may concern:*

Be it known that I, McCLINTOCK YOUNG, of Frederick, county of Frederick, and State of Maryland, have invented a new and useful Improvement in Corn-Husking Machines, of which the following is a specification.

This invention relates to a machine for automatically stripping the husks from ears of corn, embodying coöperating rotary heads between which the ears are fed and by which the husks are stripped through the action of picking devices.

The invention consists in means for positively operating the picking devices; in means for adjusting the parts to control the action of the picking devices to meet the varying conditions encountered in practice as regards the character of the husks, &c.; in mechanism for subjecting the stripped ears to a cleaning action to remove the silk or other adhering substances, and in various features of construction more fully described hereinafter and claimed.

In the accompanying drawings.

Figure 1:
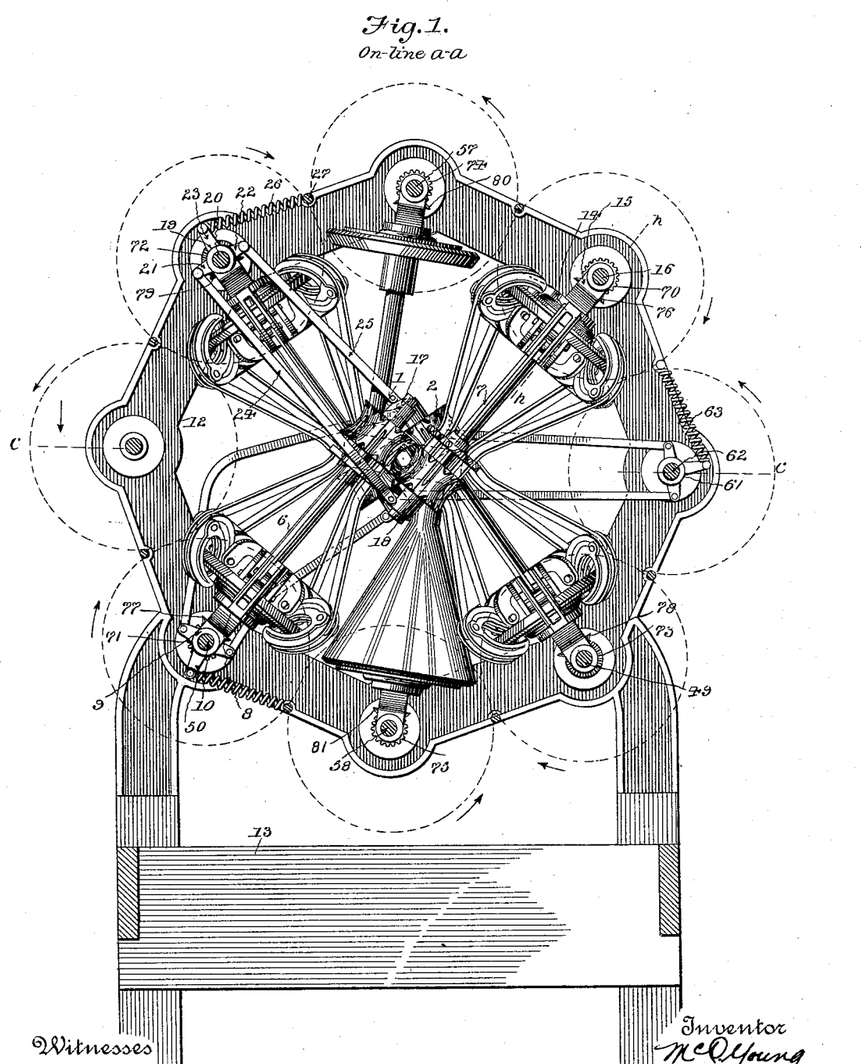
Figure 1 is a transverse vertical sectional elevation of my machine on the line $a\,a$ of Fig. 3.
Figure 3:
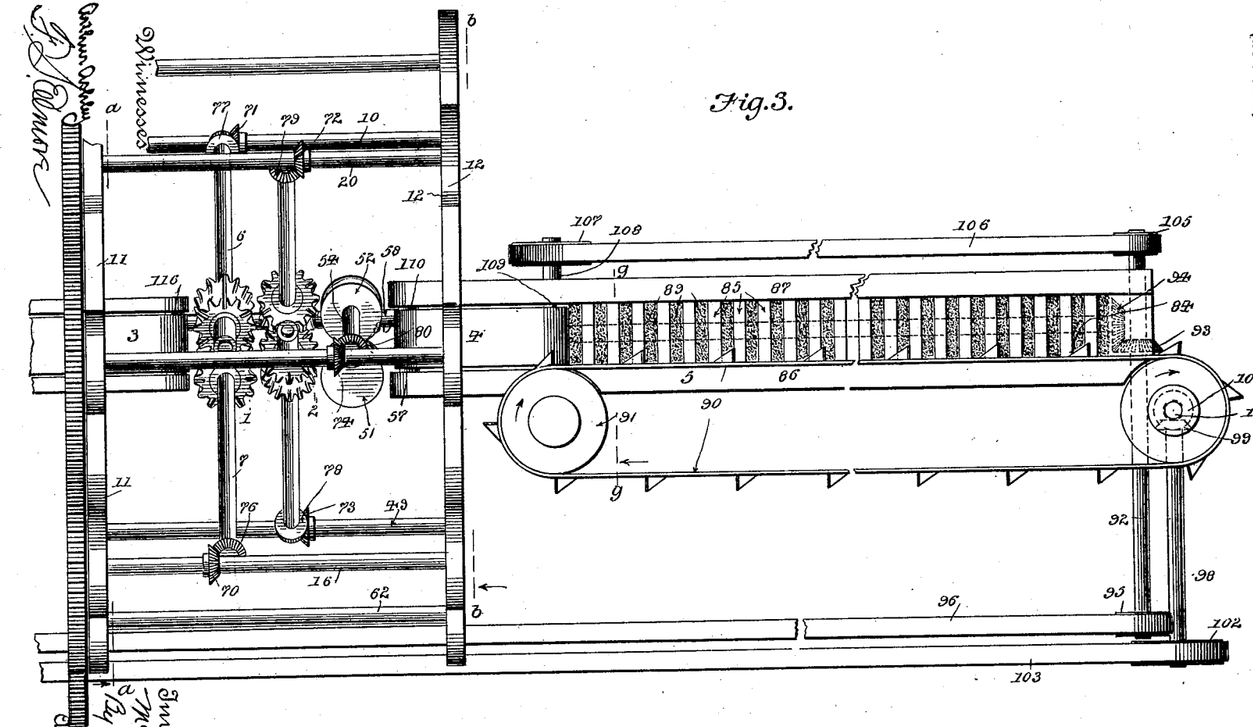
Fig. 3 is a top plan view of the machine, with a portion of the feeding-belt omitted.

Referring to the drawings, the husking mechanism comprises pairs of coöperating rotary picking-rolls 1 and 2, Figs. 1 and 3, between which the ears are fed endwise from a feeding-belt 3 at the entrance of the rolls, the husked ears as they issue from between the picking-rolls being received on a take-off belt 4 at the rear of the rolls by which they are delivered to a cleaning mechanism 5, acting to remove the silk or other adhering substances. There may be any number of picking-rolls (in the present instance there being but two pairs) arranged at different angles around a central point, the rolls of each pair opposing each other and coöperating on the ear in such manner as to simultaneously feed the same between them endwise, and through the medium of picking devices coöperating therewith strip the husks. The rolls of the first pair are fixed, respectively, near the inner ends of rotary shafts 6 and 7, which shafts extend in opposite directions outwardly, the shaft 6 having its outer end mounted in a fixed bearing-head 8, attached to arms 9, loosely encircling a horizontal longitudinal shaft 10, journaled at its ends in two vertical frame-plates 11 and 12, extending upward from a main supporting-frame 13. The companion shaft 7 has its outer end mounted in a bearing-head 14, of similar construction, sustained by arms 15, loosely encircling a horizontal longitudinal shaft 16, extending parallel to the shaft 10 and mounted in the two frame-plates. The inner ends of the two roll-shafts are mounted, respectively, in bearings 17 and 18, sustained so as to yield in opposite directions to permit the separation of the rolls to accommodate ears of varying sizes. This movement of the bearings is accomplished by means of a rocking head 19, mounted loosely on a horizontal longitudinal shaft 20, sustained by the frame-plates, the head being formed with two side arms 21 and 22 and a central arm 23. The side arm 21 is connected to the bearing 18 by a link 24, jointed to said parts, while the other side arm 22 is connected to the opposite bearing 17 by a link 25, the result being that when the head is rocked the two links will be moved in opposite directions endwise and will move the bearings toward each other or will separate them, according to the direction of the movement of the head. The head is acted on by a spring 26, connected to the central arm and a longitudinal rod 27, and tends to hold the head yieldingly with the rolls together, so as to yield and separate in the event of the passage between the rolls of a large ear. From this description it will be observed that the links 24 and 25 are connected to the bearings of the shafts 6 and 7 at points inward of the picking-rolls. This I deem of advantage in that the shafts at their inner ends are given a strong support, the rolls by this construction being maintained in their proper relative positions and the liability of their yielding by the bending of the shafts avoided.

Figures 5, 6, 7:
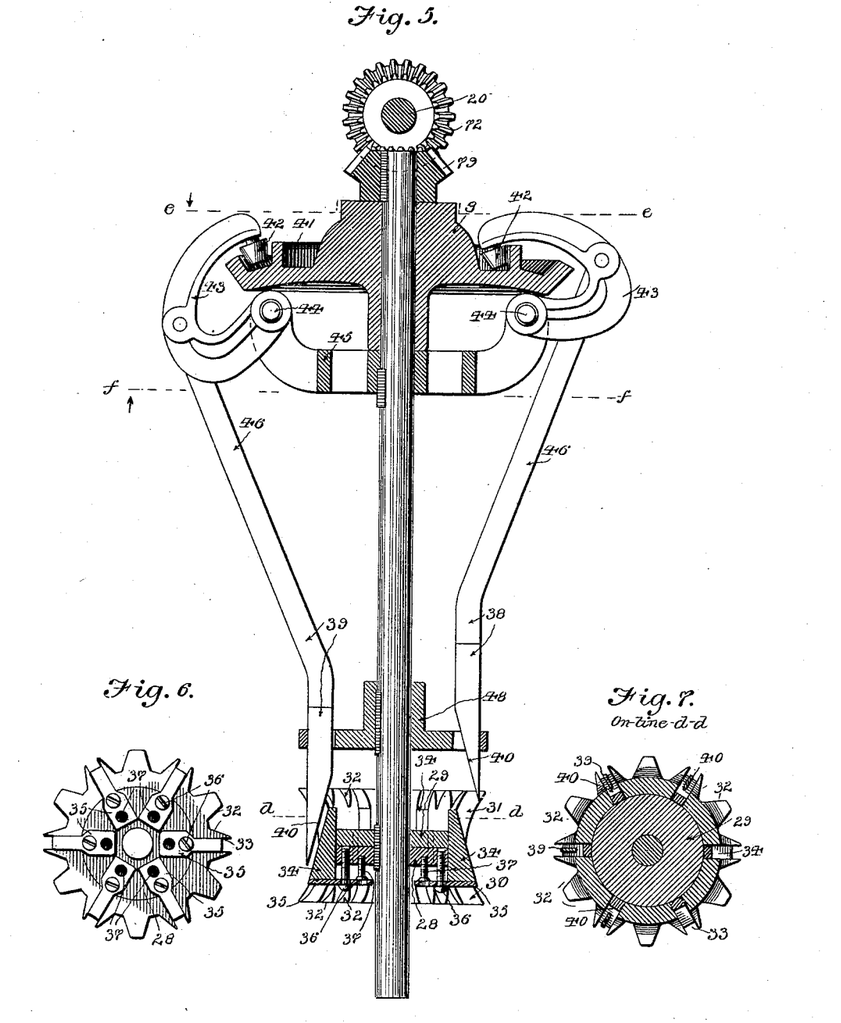
Fig. 5 is a longitudinal sectional elevation, on an enlarged scale, through one of the picking-rolls and adjacent operating mechanism.
Fig. 6 is an end elevation of one of the picking-rolls on an enlarged scale.
Fig. 7 is a transverse sectional view through one of the picking-rolls, on an enlarged scale, on the line $d\,d$ of Fig. 5.
Figure 8:
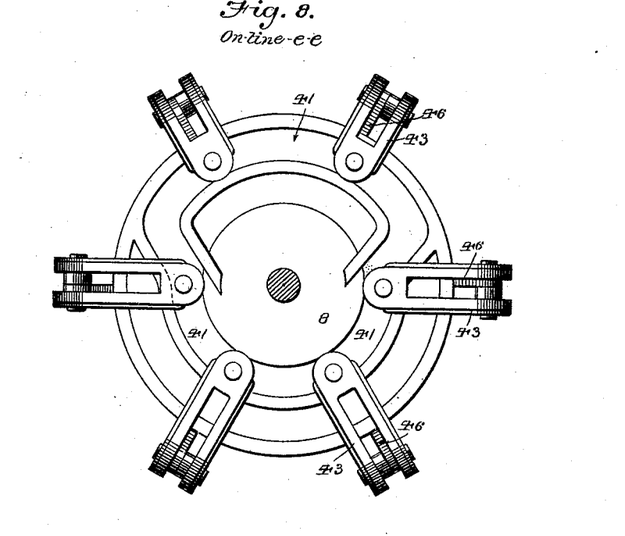
Fig. 8 is a transverse sectional elevation on the line $e\,e$ of Fig. 5 as viewed in the direction of the arrow in said figure.
Figure 9:
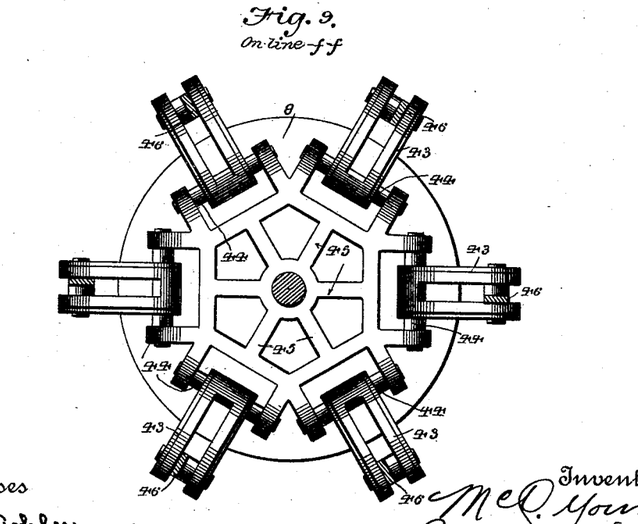
Fig. 9 is a transverse sectional elevation on the line $f\,f$ of Fig. 5, looking in the opposite direction.

Referring to Fig. 5, the rotary picking-rolls consist each of two disks 28 and 29, connected together face to face and keyed to the roll-driving shaft, and each disk has fixed to it the inner ends of two collars 30 and 31, which curve outward in opposite directions and have their outer edges formed with a series of teeth 32, this arrangement forming a roller with an inwardly-curved side and, in connection with its companion roll, presents an opening through which the ears of corn pass. The concave surface of the roll is formed with longitudinal slots or recesses 33, extending through each alternate tooth to a level with the outer edges of the disks, and extending in each slot is an abutment-block 34, inclined outward toward the inner end of the shaft. These blocks are fixed at their wider ends each on a plate 35, extending transversely of the shaft and grouped around the same and adjustably secured to the face of the disk 28 by adjusting-screws 36, extending through the inner ends of the plate and into the disk, by which construction the abutment-blocks may be adjusted independently longitudinally of the roll for the purpose hereinafter described. The movement of the blocks is limited by stops 37, extending from the face of the disk 28 in position to be engaged by the inner ends of the plates. These abutment-blocks act in connection with a series of gripping-fingers 38 39, &c., formed each with an inclined active edge 40 and with a sharpened point, and these gripping-fingers at predetermined times are moved longitudinally of the roll into the slots therein, and in connection with the inclined edges of the abutment-blocks grasp the husks and hold them while the ears are advanced by the rotary motion of the rolls, the result being that the husks are stripped from the ears while the latter are moved between the rolls. These fingers are moved into the slots to coöperate with abutment-blocks on the adjacent sides of the coöperating rolls and are retracted to release the husks on the distant sides, and positively and automatically, by a cam-slot 41, Figs. 5 and 8, formed in the outer face of the bearing-head 8, in which slot a series of friction-rollers 42, journaled on the outer ends of lever 43, travel. The levers are curved outward and then inward around the peripheral edge of the head and have their inner ends pivoted, as at 44, on a frame 45, fixed to and movable with the roll-driving shaft. The levers about midway between their ends have jointed to them the outer ends of bars 46, carrying at their opposite ends the gripping-fingers just described. The cam-groove in the head extends outward at one point near the periphery of the head half around the same and extends inward near the shaft the remaining distance, the result being that when the shaft is rotated the frame carrying the levers 43 will move with it and will cause the friction-rollers on the ends of the levers to travel in the cam-groove, and they will be moved alternately to and from the center of the head, which action will result in a reciprocating movement of the gripping-fingers longitudinally of the picking-roll into and out of the slots therein. The parts are so arranged that the movement of the gripping-fingers into the slots to grasp the shucks will take place on the adjacent sides of the coöperating rolls and the retraction of the fingers to release the shucks will take place on the distant sides of the rolls. Adjacent to the roll the gripping-fingers pass through slots in a guiding-plate 48 in order that they will be caused to move parallel to the shaft and coöperate properly with the blocks. The second pair of picking-rolls is of identically the same construction as those just described, and the gripping-fingers are operated identically in the same manner. The outer ends of the inclined shafts carrying these rolls are mounted in bearings of the same form sustained, respectively, on the horizontal longitudinal shaft 20 before alluded to and a horizontal longitudinal shaft 49, sustained in the frame-plates, and the bearings for the inner ends of these inclined shafts are controlled in their movements by the rocking head 50, similar in construction and operation to the head before described as controlling the movements of the first pair of rolls.

The two pairs of picking-rolls are arranged a slight distance apart and at different angles, so that the fingers of the second pair will grasp the shucks at points between those where the fingers of the first pair operate, to the end that the shucks may be wholly removed from all sides of the ear. The coöperating rolls of each pair are so arranged that the teeth on one roll will enter between the teeth on the companion roll. The purpose of this is to permit the rolls to separate from each other sufficiently to act on larger ears without leaving a space between the edges of the rolls, the interlocking teeth forming stops, as it were, and serving to prevent the escape of the ears from between the ends of the two rolls.

Figure 2:
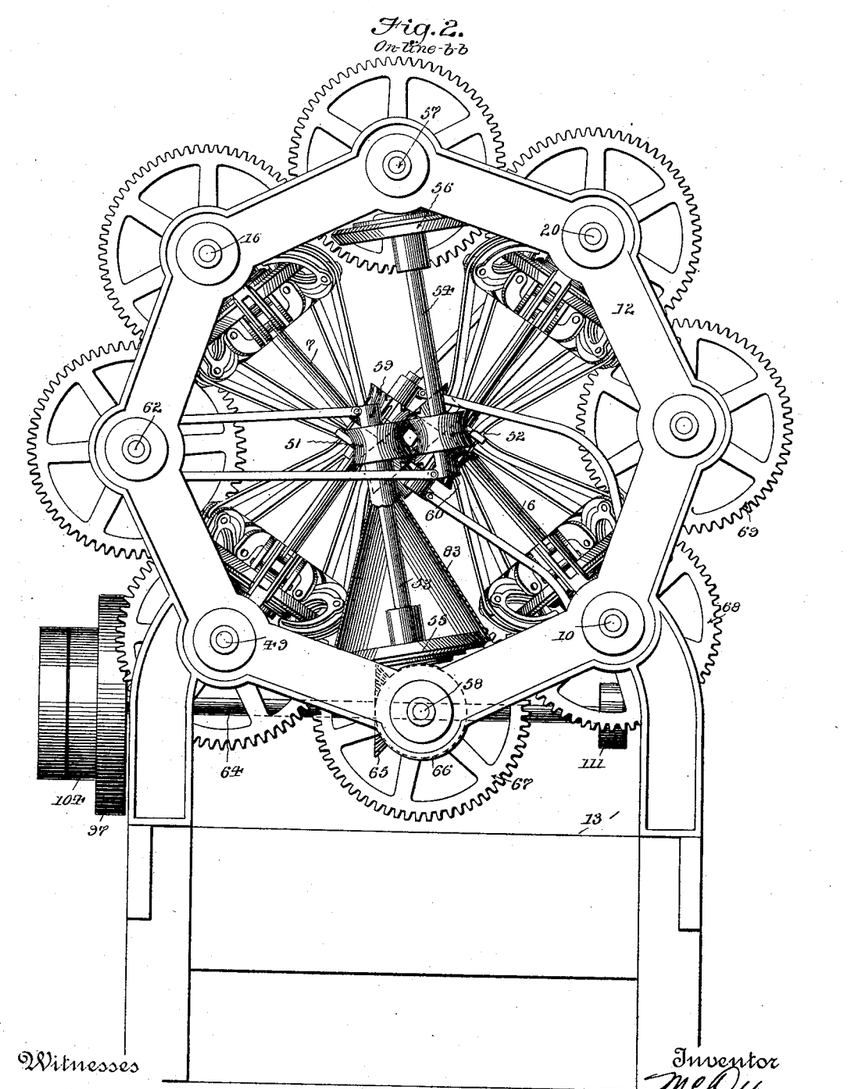
Fig. 2 is a rear sectional elevation of the husking mechanism proper on the line $b\,b$ of Fig. 3.

After the passage of the ears between the two pairs of picking-rolls to strip the shucks the ear passes between two guide-rolls 51 and 52, Figs. 2 and 3, formed with smooth inwardly-curved coöperating surfaces which act to deliver the ear onto the take-off belt. These rolls are fixed, respectively, to the inner ends of driving-shafts 53 and 54, mounted at their outer ends, respectively, in bearing-heads 55 and 56, sustained by arms mounted loosely on horizontal longitudinal shafts 57 and 58, sustained by the frame-plates. The inner ends of the driving-shafts are mounted in bearings 59 and 60, similar to those before described for the shafts of the picking-rolls, and the movements of these bearings are controlled by a rocking head 61, mounted on a horizontal longitudinal shaft 62, acted on by a spring 63.

Figure 4:
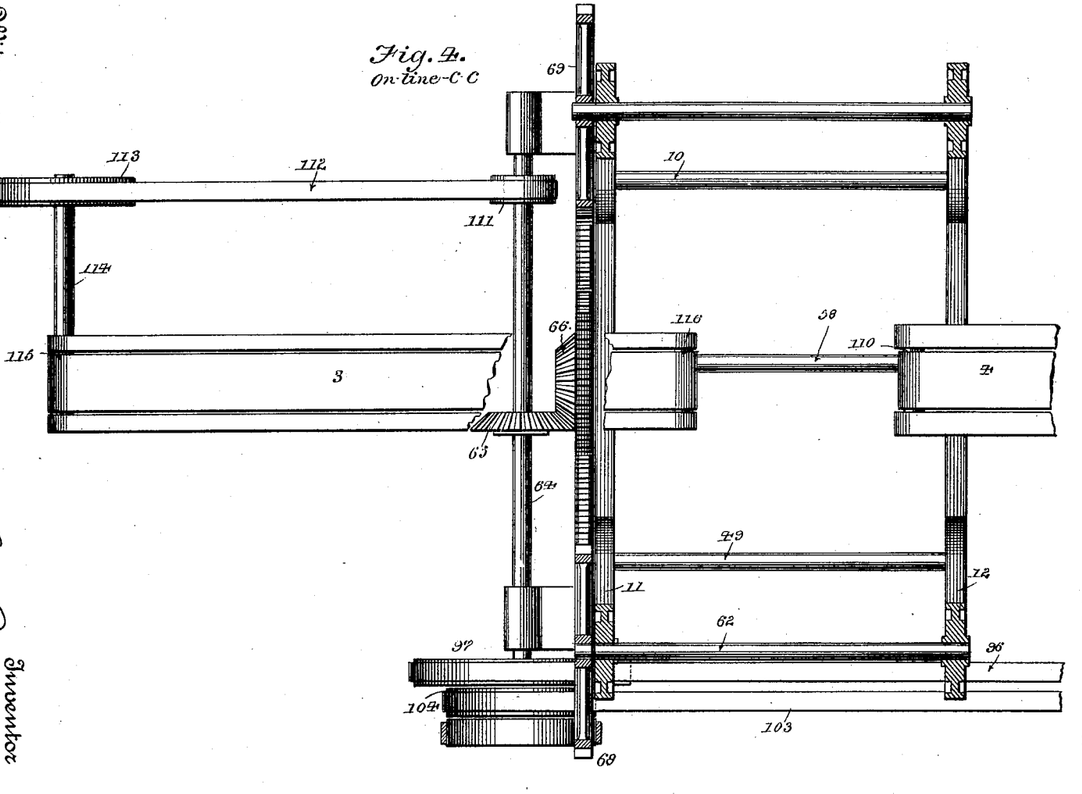
Fig. 4 is a horizontal longitudinal sectional elevation on the line $c\,c$ of Fig. 1, with the cleaning mechanism omitted.

The driving-shafts carrying the picking-rolls are rotated to revolve said rolls and to operate the gripping-fingers, and motion is imparted to the smooth guide-rolls from a main driving-shaft 64, extending transversely of the frame in rear of the rear frame-plate and mounted in bearings sustained by the frame. About midway of its length the shaft has fixed to it a vertical beveled gear 65, engaging a beveled gear 66, Fig. 4, fixed to the rear end of the lower horizontal longitudinal shaft 58. Adjacent to this beveled gear the longitudinal shaft has fixed to it a large pinion 67, from which motion is imparted to the various horizontal longitudinal shafts by a series of intermeshing pinions 68 69, &c., fixed, respectively, to said shafts, by which means the adjacent longitudinal shafts are rotated in opposite directions. From these longitudinal shafts motion is imparted to the inclined driving-shafts by beveled gears 70, 71, 72, 73, 74, and 75, fixed, respectively, to the longitudinal shafts and engaging beveled gears 76, 77, 78, 79, 80, and 81, fixed, respectively, to the outer ends of the inclined driving-shafts beyond the bearing-heads, as a result of which arrangement the opposing rolls of each pair will be rotated in opposite directions and rearward at their adjacent sides, thereby feeding the ears between them rearward, the husks as they are stripped falling downward.

To prevent the falling husks from being caught in the gearing-wheels by which motion is imparted from the lower longitudinal shaft to the guide-roll, I propose to fix to the bearing-head of this inclined shaft a conical housing 83, Fig. 2, extending upward and around the shaft and terminating adjacent to the guide-roll.

Figure 10:
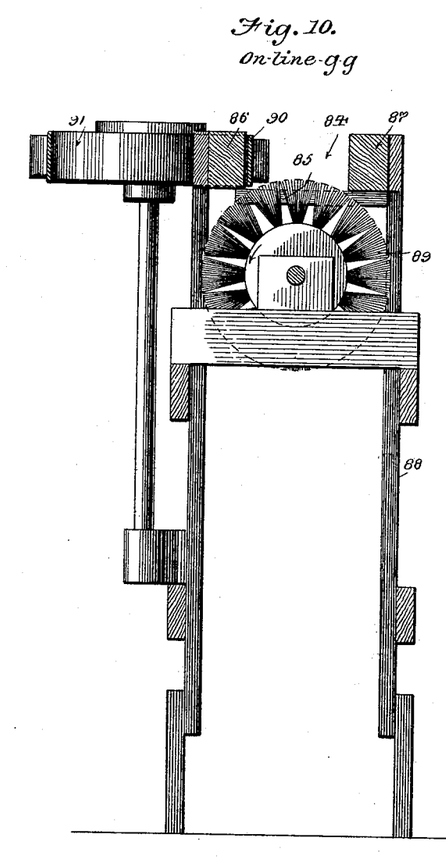
Fig. 10 is a transverse vertical sectional elevation through the cleaning mechanism on the line $g\,g$ of Fig. 3, looking forward.
Figure 11:
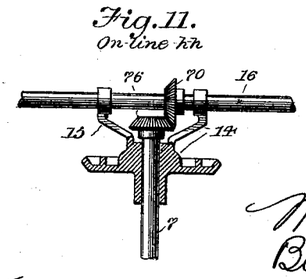
Fig. 11 is a vertical longitudinal section through the bearing of one of the driving-shafts for the picking-rolls on the line $h\,h$ of Fig. 1.

From the foregoing description it will be seen that the gripping-fingers are positively operated by the cam-groove and connecting-levers, and as a result their action is effective and there is little or no liability of interruptions in the operation or of the parts being deranged. It will also be observed that by reason of the adjustability of the abutment-blocks, in connection with which the inclined edges of the gripping-fingers operate to grasp the husks, the space between the adjacent active faces of said parts may be varied to meet the varying conditions encountered in practice as regards the difference in thickness of the husks, the size of the ears, &c. The removal of the silk or other adhering substances from the stripped ears is effected by the cleaning mechanism before alluded to, to which the ears are delivered by the take-off belt. This mechanism is sustained at the delivery end of the husking mechanism and comprises a longitudinally-extending trough 84, Figs. 3 and 10, having a bottom provided with transverse openings formed by slats 85, fixed to the under side of two longitudinal beams 86 and 87, sustained by standards 88 at the opposite ends of the beams. Beneath this beam is located a rotary brush 89, extending longitudinally, with its ends mounted in bearings on the frame and arranged close up against the slats, so that the bristles will extend upward through the same. When the brush is rotated in the direction of the arrow, Fig. 10, it will act on the ears transversely and push them laterally against a vertical conveying-belt 90, by which they will be carried along endwise and at the same time be subjected to the cleaning action of the brush. The bristles on the rotary brush, extending through the transverse openings between the slats, in addition to urging the ears sidewise against the conveyer subjects them to a transverse brushing action, by which the adhering "silk" is effectually removed. The slats afford a rigid support for the ears as they are advanced by the belt and prevent them from being jammed by the brush. The conveying-belt passes along the face of the longitudinal beam 86 and around horizontal driving-pulleys 91 at the ends of the same, and in this manner forms in effect one side of the trough.

The rotary brush is driven by a horizontal shaft 92, extending at the rear end of the frame and provided with a beveled gear 93, engaging a gear 94 on the end of the brush-shaft. On its outer end the horizontal shaft 92 has a driving-pulley 95 fixed to it, and is driven by a belt from a pulley 97 on the main driving-shaft. The conveyer-belt is driven by a horizontal shaft 98, located in rear of the shaft 92 and provided with a beveled gear 99, engaging a beveled gear 100 on a vertical shaft 101, connected at its upper end to the belt-pulley. The outer end of shaft 98 has a pulley 102 fixed to it, driven by a belt 103 from a pulley 104 on the main driving-shaft.

The take-off belt between the shucking and cleaning mechanisms is driven from the shaft 92, which is extended beyond the trough, where it is provided with a pulley 105, connected by a belt 106 to a pulley 107 on the end of a shaft 108, connected to the pulley 109, over which the take-off belt passes at its rear end, its opposite end passing over a roll 110, situated at the delivery end of the guide-rolls. The feed-belt at the entrance of the picking-rolls is also driven from the main shaft by a pulley 111, connected by a belt 112 to a pulley 113 on the end of a shaft 114, connected to a pulley 115, over which the feed-belt passes at its front, its opposite end passing over a roll 116, situated at the entrance of the picking-rolls.

It is seen from this description that the main driving-shaft imparts motion to all the operative parts of the machine, including the feed-belt, the picking-rolls, the take-off belt, the brush, and the conveyer-belt. It will be understood, of course, that other forms of driving devices or gear may be substituted, but I prefer to adopt the arrangement shown and described as being simple and effective.

Having thus described my invention, what I claim is—

1. In a corn-husking machine the combination with rotary rolls adapted to feed the ear endwise between them, of gripping devices coöperating with said rolls to grasp the husks and movable bodily around with the rolls, fixed heads formed each with a camway, levers also movable bodily around with the rolls operated by the cams, and connections between the levers and gripping devices.

2. In a corn-husking machine the combination with coöperating rotary rolls adapted to feed the ear endwise between them, of gripping devices coacting with said rolls to grasp the husks and movable bodily with the rolls, fixed heads provided each with a cam-slot, frames movable with the rolls, levers pivoted to the frames and engaging in the cam-slots, and rods connecting the levers with the gripping devices.

3. In a corn-husking machine the combination with rotary rolls for feeding the ear endwise, of coöperating gripping devices to grasp the husks, fixed heads provided each with a cam-slot, frames movable with the rolls, levers pivoted at one end to the frames and extending around the edge of the heads and engaging at their other ends in the slots, and rods connecting the levers between their ends with the gripping devices.

4. In a corn-husking machine, the combination with a rotary shaft, of a picking-roller carried thereby, a fixed bearing-head loosely surrounding the shaft and formed with a camway, a frame fixed to the shaft, a series of levers pivoted at one end to the frame and engaging at their opposite ends in the cam-slot, and a series of gripping devices jointed to the levers.

5. In a corn-husking machine the combination with a rotary roll formed with abutments, of movable gripping-fingers coöperating with said abutments, means for moving said fingers, and means for adjusting one part with relation to the other.

6. In a corn-husking machine the combination with a rotary roll, of longitudinally-adjustable abutments sustained thereby, movable gripping-fingers coöperating with said abutments, and means for moving the gripping-fingers longitudinally.

7. In a corn-husking machine the combination with opposing rotary rolls, of longitudinally-adjustable abutments sustained thereby and formed of inclined active faces, and longitudinally-movable gripping-fingers coöperating with said abutments.

8. In a corn-husking machine the combination with opposing rotary rolls mounted to yield one with respect to the other and formed with concave faces and having on their edges a series of teeth adapted to interlock, with certain teeth of each roll slotted, of movable gripping-fingers acting in said slots and adapted to coöperate with said rolls to grasp the husks.

9. In a corn-husking machine the combination with opposing rotary rolls mounted to yield one with respect to the other and formed with concave sides and having on their edges a series of teeth adapted to interlock, and the alternate teeth of each roll slotted, of movable gripping-fingers acting in said slots and adapted to coöperate with said rolls to grasp the husks.

10. In a corn-husking machine the combination with opposing coöperating picking-rolls for feeding the ear endwise between them, of driving-shafts connected to said rolls and sustained at their ends in bearings pivotally mounted, bearings at the inner ends of the shafts situated respectively inward of the rolls, and means acting on said bearings and tending to hold the shafts yieldingly together; whereby the inner ends of the shafts may separate, and whereby the shafts are given firm support on both sides of the rolls.

11. The combination with the trough provided with upright sides and with a bottom consisting of transverse slats with open spaces between them of a longitudinally-moving conveyer arranged at one side of the trough from end to end and constituting in effect one wall thereof, a rotary brush extending longitudinally of the trough beneath its bottom with the bristles extending upward into the trough between the slats and means for rotating said brush in a direction transversely of the trough; whereby the ears are supported by the slats and simultaneously urged toward the conveyer and subjected to a transverse brushing action.

In testimony whereof I hereunto set my hand, this 29th day of June, 1898, in the presence of two attesting witnesses.

McCLINTOCK YOUNG.

Witnesses:
EDWIN C. MARKELL,
J. MARSHALL MILLER.